United States Patent [19]
Parrot et al.

[11] Patent Number: 5,511,747
[45] Date of Patent: Apr. 30, 1996

[54] ARRANGEMENT FOR THERMAL PROTECTION OF AN OBJECT, SUCH AS A THERMAL SHIELD

[75] Inventors: Pierre Parrot; Philippe Lalanne, both of Bordeaux; Philippe Herman, Saint Medard en Jalles; Jean-Louis Tisne, Martignas, all of France

[73] Assignee: Aerospatiale Societe Nationale Industrielle, Cedex, France

[21] Appl. No.: 352,685

[22] Filed: Nov. 30, 1994

Related U.S. Application Data

[63] Continuation of Ser. No. 45,472, Apr. 13, 1993, abandoned.

[30] Foreign Application Priority Data

Apr. 23, 1992 [FR] France .................. 92/05260

[51] Int. Cl.⁶ ........................................ B64G 1/58
[52] U.S. Cl. .......................... 244/158 A; 428/920
[58] Field of Search ...................... 244/117 A, 421, 244/158 A; 428/902, 920, 913

[56] References Cited

U.S. PATENT DOCUMENTS

| | | | |
|---|---|---|---|
| 3,769,511 | 10/1973 | Delacy | 244/158 A |
| 4,151,800 | 5/1979 | Dotts et al. | |
| 4,338,368 | 7/1982 | Dotts et al. | |
| 4,358,480 | 11/1982 | Ecord et al. | |
| 4,373,003 | 2/1983 | Schomburgh et al. | |
| 4,439,968 | 4/1984 | Dunn | 244/158 A |
| 4,456,208 | 6/1984 | MacConochie et al. | 244/158 A |
| 4,515,847 | 5/1985 | Taverna et al. | |
| 4,686,128 | 8/1987 | Gentilman | 244/158 A |
| 4,706,912 | 11/1987 | Perry | 244/158 A |
| 4,713,275 | 12/1987 | Riccitiello et al. | 244/158 A |
| 4,833,030 | 5/1989 | Petersen | 244/158 A |
| 4,852,630 | 8/1989 | Hamajima et al. | 244/158 A |
| 5,209,896 | 5/1993 | Lipa et al. | 244/158 A |

FOREIGN PATENT DOCUMENTS

| | | | |
|---|---|---|---|
| 0440544 | 8/1991 | European Pat. Off. | 244/158 A |
| 2489812 | 3/1982 | France . | |
| 2493304 | 5/1982 | France . | |
| 2525963 | 11/1983 | France . | |
| 2652036 | 3/1991 | France . | |

*Primary Examiner*—Galen L. Barefoot
*Attorney, Agent, or Firm*—Sandler, Greenblum & Berstein

[57] ABSTRACT

Arrangement for the thermal protection of an object, particularly a space vehicle, such as a space missile, including a frame structure covered with thermal insulating material, wherein the material is made of an aggregate of carbon or silica short fibers, the fibers being linked together by means of a binder made of the same constituent and possibly of an appropriate resin. The aggregate is in the form of at least one monobloc element, which is accordingly shaped and dimensioned, and adhered onto the frame structure.

13 Claims, 1 Drawing Sheet

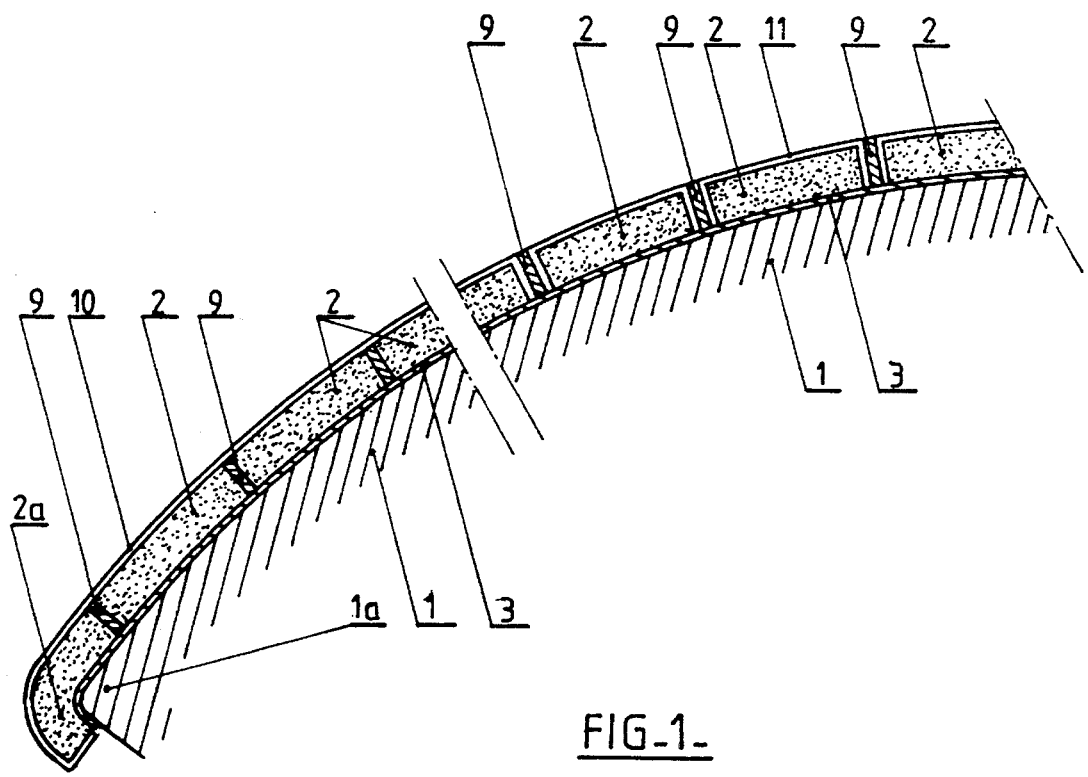
FIG_1_
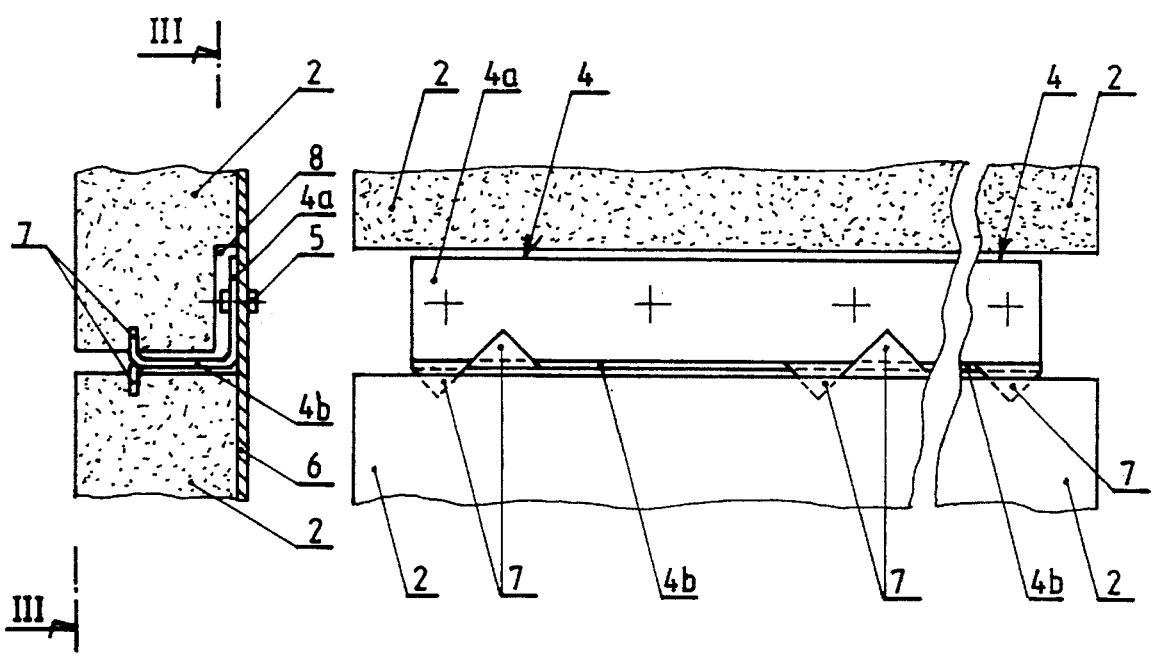
FIG_2_  FIG.3.

ARRANGEMENT FOR THERMAL PROTECTION OF AN OBJECT, SUCH AS A THERMAL SHIELD

This application is a continuation of application Ser. No. 08/045,472, filed Apr. 13, 1993, now abandoned.

BACKGROUND OF THE INVENTION

1. Field of the Invention

The present invention relates to the thermal protection particularly of objects which are likely to face very high heat flows during a relatively short period, such as space vehicles or missiles entering planetary atmospheres.

2. Discussion of Background Information

When vehicles of missiles such as reentry capsules or space probes, either re-enter or enter the atmosphere of another planet the outer surface undergoes thermal flows generated by convective and/or radiative phenomena in connection with the very high speed gas flow occurring around the object while it is entering.

In order to face such conditions, thermal protections are already made and consist in either so-called "thermo-structural" materials which are, for example, glued or mechanically bonded onto the object to be protected, or in special frame structures covered with thermal and/or ablative insulating materials.

As thermo-structural materials, there are known carbon-carbon composite materials, such as those disclosed in FR-2,493,304, or those thermoresistants which are metal-based, such as Beryllium.

As frame structures covered with thermal and/or ablative insulating materials for preventing the underlying structure from overheating, metal structures or composite materials structures are known. These frame structures are covered with materials made of silicone and reinforced with mineral fibers, such as those disclosed in FR-2,652,036 filed by the present assignee, or lightened by adding microballs or bubbles.

These metal frames or composite material structures also can be covered with materials called "carbon/resin" and/or "silica/resin" which are reinforced with carbon or silica fibers and show very high temperature strength.

The various solutions described above present several disadvantages.

The main disadvantages in using so-called thermo-structural materials lie in the fact that:

it is difficult, not to say impossible, to make monolithic parts having the required dimensions if those materials are to be used to manufacture a thermal shield intended for a reentry capsule, for example, such difficulty being nevertheless overcome by designing a bonding system between elementary parts, such as gluing for example;

it is very costly owing to long designing cycles;

it involves industrial risk due to the length of the designing cycle and the difficulty, or even the impossibility, of repairing in case defects or deterioration should be found when later manufacturing or using, this feature being particularly significant for carbon-carbon, especially when assembling carbon-carbon elementary parts results in a monolithic final part;

physiological dangers are connected with the use of Beryllium.

As regards the structures covered with insulating and/or ablative materials, the use of reinforced and/or lightened silicones, or silica/resin or carbon/resin compounds presents the following disadvantages:

the total mass, frame structure plus material, resulting from that type of protection;

the fact that it is impossible to make the exhaust gas go through the thermal protection when launching the object into space since such material is tight; the gas must therefore escape through a path which does not go through the thermal protection;

the inadequacy of the safety margins compared with the thermal flow forecasting when entering the planet atmosphere, such margins depending on the deterioration rate of the material submitted to said flow.

SUMMARY OF THE INVENTION

The present invention aims to provide a thermal protection structure for space vehicles or missiles allowing gaseous exchanges with the outside and being able to undergo thermal conditions which are liable to be met when entering oxidizing as well as non-oxidizing atmospheres, and this, with the best possible balance between the mass of the protecting structure and its price.

The invention also aims to make the use of a thermal protecting structure on various objects which may be of very large size easier and cheaper.

It is therefore an object of the invention to provide an arrangement for the thermal protection of an object, and more particularly a space vehicle or missile, of the type comprising a frame structure covered with a thermal insulating material, characterized in that the material is composed of a carbon or silica short fibers aggregate, said fibers being linked by a binder made of the same constituent and eventually of an appropriate resin, the aggregate being used in the form of a monobloc element at least, suitably shaped and dimensioned, and glued on the frame structure.

Preferably, this aggregate comprises fibers having a diameter equal to or less than 10 micrometers, a length equal to or less than 700 micrometers, and a density (specific gravity) included about 0.2 and 0.5.

Such material has a porosity ratio which is very high, even exceeding 80% in volume, and which takes into account outgassing problems during the launching phase of the object thereby protected.

Besides, this type of material is easily adapted for making slab or tile type modular elements designed for covering the frame structure, such as a space probe or capsule thermal shield, through manufacturing or moulding. Moreover, it is rigid enough to keep the geometry of the outer surface of the elements, particularly when entering an atmosphere.

The choice of the material in accordance with specific areas of the shield and/or in accordance with the atmosphere entering conditions and the nature of the atmosphere still increases the versatility of application of the structure according to the invention. Therefore, for a shield which will have to go through an oxidizing atmosphere, for example, a silica aggregate shall be used, whereas for a non-oxidizing atmosphere a carbon aggregate can be used.

Anyhow, since these types of materials tend to crumble away, the exposed surface of the material will be advantageously treated to be anti-crumbling, for example, by using a plastic protecting film cover of the known type.

The use of aggregates having a density below 0.5 allows structures to be made which are slightly lighter than structures covered with the above-mentioned thermal and/or ablative insulating materials, as well as cheaper since the monobloc modular elements according to the invention are easily manufactured and mounted.

Mounting is easily performed by merely gluing, according to the method known in the art, with silicone adhesive, the slabs or tiles being placed side-by-side when a mosaic cover is realized, with a joint of glue as described above inserted between the slabs or the tiles.

BRIEF DESCRIPTION OF THE DRAWINGS

Other features and advantages of the invention will be more fully set forth in the following description of several embodiments of the arrangement according to the invention, such description being given as an example only and considered in connection with the attached drawings wherein:

FIG. 1 is a cross-sectional view of a frame structure provided with a cover according to the invention, on the left-hand part, and of the same frame structure provided with a cover according to another embodiment, on the right-hand part;

FIG. 2 shows a complementary fixing mode of the cover of FIG. 1 on the frame structure, and FIG. 3 is a sectional view on the line III—III of the arrangement of FIG. 2.

DETAILED DESCRIPTION OF THE PREFERRED EMBODIMENTS

In FIG. 1 there is shown at 1 a frame structure consisting, for example, of a part of a dome-shaped thermal shield structure whose outer face is equipped with a protecting arrangement according to the invention. The figure shows the structure according to a sagittal section.

The frame structure 1 is a metal frame or a structure consisting of a honeycombcore assembly possibly covered with fabric made of high modulus carbon for example, such assembly being marketed by the present assignee under the trade name of NIDA.

The left-hand part of FIG. 1 shows the peripheral area of the shield, and the right-hand part shows the central area.

In accordance with the present invention the covering added on the outer face of the frame structure 1 consists of several individual slabs 2 made of a carbon or silica aggregate.

The slabs 2 are not necessarily of the same shape and dimension, nor the same nature, depending on the shape and particularly the curvature of the shield, and also on the area where the slabs are set on the shield.

The carbon or silica aggregates are known materials, consisting of fibers of one of the above-mentioned constituents linked together by means of a binder essentially made of the same constituent.

Preferably, the diameter of the carbon or silica fibers is equal to or less than 10 micrometers, and the length is equal to or less than 700 micrometers.

Fibers are linked together by means of a binder made of the same constituent and possibly of an appropriate resin.

The carbon aggregates comprise fibers linked together by carbon, whereas the silica aggregates consist of silica fibers linked together by a binder made of silica and formophenolic resin.

For making such materials, particularly the silica aggregates, one can advantageously refer to patent FR-2,489,812 by the present assignee.

In accordance with the invention, aggregates having a density between about 0.2 and 0.5 should preferably be used.

Such materials have remarkable temperature stability properties, are porous, and are rigid enough to maintain the geometry of the outer surface of the elements made of such materials, particularly when entering an atmosphere, and can be easily dimensioned and shaped so as to fit the object to be covered, by machining or moulding.

On the circumference of the shield, where the curvature (1a) significantly increases, the slabs 2a are shaped so as to take the exact curvature of the shield.

The porosity ratio of the slabs 2, 2a can be extremely high, and can, for example, exceed 80% of the volume of the slabs.

Although the high porosity of such materials allows gas to circulate somehow, a feature which is much sought after so that the gas generated during the launching phase can escape outside the object equipped with the shield, it has been verified that, when reentering or entering another atmosphere, no great increase in temperature due to very high-speed gas flows around the object was registered on the frame structure 1.

The easy shaping of the slabs 2, 2a enables the outer face of the slab to be provided with the most appropriate shape so as to provide a maximum braking surface, particularly in the center area of the shield (right-hand part in FIG. 1).

The slabs 2, 2a are added on the frame structure 1 and glued according to an already known manner, and more specifically with silicone glues (adhesives). This adhesive layer is shown at 3 in FIG. 1. Generally speaking, the adhesive 3 is either pre-degassed before being used or degassed once it has been used. Besides, the layer 3 is not continuous on the whole extent of the slab-frame structure interface, and voids are provided for now and then in the layer 3, so as to maintain the required porosity of the slab-frame structure unit.

Gluing can eventually be completed by a mechanical attachment thanks to metal lugs or claws, for example, such as those represented FIGS. 2 and 3. FIGS. 2 and 3 show how two adjoining slabs 2 are attached together thanks to a right-angled part 4.

The right-angled part 4 comprises a wing 4a for fixing the part, for example, by means of rivets 5 (FIG. 2), on a metal plate 6 which forms part of the frame structure, and a wing 4b provided with claws 7 extending on each side, the claws being designed to penetrate into the edge of two adjoining slabs 2.

Abreast of the wing 4a, the inner face of the slab 2 is provided with a machined recess 8 for lodging the wing 4a and rivets heads 5 so that the outer faces of the slabs be level.

The slabs 2, 2a are placed side by side and at a distance from one another, the interval 9 between the slabs being filled with a adhesive similar to the one used for the fixing layer 3 and applied under the same conditions.

As for the slabs made of a carbon aggregate, because such material tends to crumble away under the action of gas flows along the wall of the shield, it is better that the surface of the slabs should be treated. This anti-crumbling treatment may consists in gluing a plastic film on the outer face of the slabs, for example, according to a method known in the art, the film being perforated so as to maintain the required porosity of the entire thermal protection arrangement.

Such film is represented at 10 on the left hand side of FIG. 1 and is placed once the slabs 2, 2a are fixed on the structure 1. On the right hand side of FIG. 1, the slabs 2 are also provided with this film 11, but the latter is placed on the slabs before they are fixed on the structure, the individual film 11 of each slab 2 overflows the four side faces of the slab, the glue joint 9 between the slabs being in contact with the film of the slabs.

The carbon slabs 2, 2a are preferably used for the thermal protection of shields or other probes frame structures, space capsules or other space objects or vehicles liable to encounter non-oxidizing atmospheres such as those met on several planets other than the earth.

In oxidizing atmospheres such as the earth atmosphere, carbon cannot be used because of the oxidation process. In that case, the slabs are made of a silica aggregate.

If the surface of the frame structure which is to be thermically protected is small, one slab or similar corresponding to the required shape and dimensions can be used.

Generally speaking, the modular structure of the cover according to the invention allows to make slabs, tiles or similar of standard dimensions in advance and to perform conformity checks prior to the installation on the frame structure.

The variety of the available materials allows to choose the type of material which is best suited to the requirements.

Thereby, on the same shield it is possible to use slabs or similar of various shapes and nature (carbon or silica) for example, depending on the area of the shield.

Furthermore, if defects or degradation are discovered when making the protecting structure or once it has been used, for example, repairing the thermal protection covering according to the invention is made easier and cheaper by locally intervening in order to replace the defective or damaged slab(s) or similar, therefore preventing from wasting the whole structure.

The various advantages of such thermal and porous covering structure allow to obtain thereby a good balance between the mass of such covering and its price.

Finally, the invention is not limited to the embodiments herabove represented and described, but on the contrary covers all the variants without departing from the scope of the invention.

We claim:

1. An arrangement for thermal protection of an object, comprising:

a frame structure;

thermal insulating material covering said frame structure, said thermal insulating material comprising a porous aggregate of fibers selected from the group consisting of carbon short fibers and silica short fibers, said fibers comprising a diameter of less than or equal to 10 micrometers, and a length less than or equal to 700 micrometers;

a binder linking said fibers together, said binder comprising the same constituent as said fibers; and said aggregate comprising a specific gravity of between about 0.2 and 0.5, and is in the form of at least one monobloc element, said at least one monobloc element is attached to a surface of said frame structure, and a fixing adhesive layer is discontinuously positioned between inner faces of said plurality of slabs and said surface of said frame structure.

2. The arrangement according to claim 1, wherein said at least one monobloc element comprises a plurality of slabs positioned side-by-side in a mosaic manner.

3. The arrangement according to claim 2, wherein a fixing adhesive is positioned in spaces between adjacent slabs of said plurality of slabs.

4. The arrangement according to claim 2, wherein said at least one monobloc element comprises an outer face, and said outer face comprises an anti-crumbling element.

5. The arrangement according to claim 4, wherein said anti-crumbling element comprises a plastic, perforated film adhered to said outer face.

6. The arrangement according to claim 5, wherein said plastic, perforated film is adhered to said outer face after said at least one monobloc element is positioned on said frame structure.

7. The arrangement according to claim 5, wherein said plastic, perforated film is adhered to said outer face of said at least one monobloc element prior to attachment of said at least one monobloc element to said frame structure, and said plastic, perforated film covers sides of said at least one monobloc element.

8. The arrangement according to claim 1, wherein said at least one monobloc element comprises a plurality of adhesively connected monobloc elements.

9. The arrangement according to claim 8, wherein said plurality of adhesively connected monobloc elements are further connected by mechanical elements.

10. The arrangement according to claim 9, wherein said mechanical elements comprise lugs connecting adjacent monobloc elements.

11. The arrangement according to claim 1, wherein said object comprises a space vehicle.

12. The arrangement according to claim 1, wherein said binder comprises a resin.

13. The arrangement according to claim 1, wherein said aggregate has a porosity of at least 80%.

* * * * *